(12) United States Patent
Wang et al.

(10) Patent No.: US 12,461,651 B2
(45) Date of Patent: Nov. 4, 2025

(54) DATA WRITING METHOD, MEMORY STORAGE DEVICE AND MEMORY CONTROL CIRCUIT UNIT

(71) Applicant: Hefei Core Storage Electronic Limited, Anhui (CN)

(72) Inventors: Chih-Ling Wang, Anhui (CN); En Yang Wang, Anhui (CN); Kuai Cao, Anhui (CN); Dong Dong Yao, Anhui (CN); Yun Peng Zhang, Anhui (CN); Wen Qing Lv, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 18/760,055

(22) Filed: Jul. 1, 2024

(65) Prior Publication Data
US 2025/0244871 A1     Jul. 31, 2025

(30) Foreign Application Priority Data
Jan. 25, 2024   (CN) .......................... 202410102021.8

(51) Int. Cl.
 G06F 3/06 (2006.01)
(52) U.S. Cl.
 CPC ............ *G06F 3/0608* (2013.01); *G06F 3/064* (2013.01); *G06F 3/0659* (2013.01); *G06F 3/0679* (2013.01)
(58) Field of Classification Search
 None
 See application file for complete search history.

(56) References Cited

U.S. PATENT DOCUMENTS

| | | | |
|---|---|---|---|
| 8,019,925 B1 | 9/2011 | Vogan et al. | |
| 8,615,500 B1* | 12/2013 | Armangau | G06F 16/1752 707/693 |
| 2006/0064539 A1* | 3/2006 | Mukaida | G06F 12/0246 711/202 |
| 2008/0120353 A1* | 5/2008 | Kwon | G06F 11/1435 |
| 2008/0183950 A1* | 7/2008 | Roohparvar | G06F 12/04 711/103 |

(Continued)

FOREIGN PATENT DOCUMENTS

| | | |
|---|---|---|
| CN | 102623052 | 8/2012 |
| CN | 111583976 | 8/2020 |

(Continued)

OTHER PUBLICATIONS

"Office Action of Taiwan Counterpart Application", issued on Jan. 21, 2025, p. 1-p. 5.

*Primary Examiner* — Jared I Rutz
*Assistant Examiner* — Elias Young Kim
(74) *Attorney, Agent, or Firm* — JCIPRNET (57) ABSTRACT

A data writing method, a memory storage device, and a memory control circuit unit are provided. The data writing method includes the following: calculating a first number according to a ratio of a capacity of at least one first system table to a capacity of a physical block; calculating a second number according to a ratio of a capacity of at least one second system table to the capacity of the physical block; and obtaining at least one physical block from a plurality of physical blocks as a first virtual block and a second virtual block based on the first number and the second number respectively.

12 Claims, 7 Drawing Sheets

(56) References Cited

U.S. PATENT DOCUMENTS

| | | | |
|---|---|---|---|
| 2009/0043984 A1* | 2/2009 | Chang | G06F 3/0644 |
| | | | 711/E12.083 |
| 2010/0185802 A1* | 7/2010 | Asnaashari | G06F 3/0608 |
| | | | 711/170 |
| 2010/0205145 A1* | 8/2010 | Eshita | G06F 3/0674 |
| | | | 707/822 |
| 2013/0262747 A1 | 10/2013 | Chang | |
| 2013/0262748 A1* | 10/2013 | Chang | G06F 12/145 |
| | | | 711/E12.016 |
| 2013/0262810 A1 | 10/2013 | Chang | |
| 2018/0046385 A1* | 2/2018 | Altaparmakov | G06F 12/0868 |
| 2018/0129414 A1 | 5/2018 | Yeh | |
| 2019/0146678 A1 | 5/2019 | Mehra et al. | |
| 2020/0241783 A1* | 7/2020 | Rao | G06F 12/0238 |

FOREIGN PATENT DOCUMENTS

| | | |
|---|---|---|
| JP | 2008191855 | 8/2008 |
| TW | 201225109 | 6/2012 |
| TW | I661299 | 6/2019 |
| TW | I717751 | 2/2021 |
| TW | 202207230 | 2/2022 |
| TW | 202305598 | 2/2023 |

\* cited by examiner

DATA WRITING METHOD, MEMORY STORAGE DEVICE AND MEMORY CONTROL CIRCUIT UNIT

CROSS-REFERENCE TO RELATED APPLICATION

This application claims the priority benefit of China application serial no. 202410102021.8, filed on Jan. 25, 2024. The entirety of the above-mentioned patent application is hereby incorporated by reference herein and made a part of this specification.

BACKGROUND

Technical Field

The disclosure relates to a memory management technology, and in particular, relates to a data writing method, a memory storage device, and a memory control circuit unit.

Description of Related Art

In recent years, smartphones, tablets, and personal computers have scored significant growth, so consumer demand for storage media increases rapidly. The rewritable non-volatile memory modules (e.g., a flash memory) are ideal for being built in the abovementioned portable multi-media apparatuses thanks to their features such as data non-volatility, low power consumption, compact sizes, and absence of mechanical structures.

Generally, the rewritable non-volatile memory module in a memory storage device uses a channel as a unit to manage each physical block in the rewritable non-volatile memory module. Nevertheless, such a management method may be rigid in some situations, and accessing performance of the memory storage device may thus be limited as a result.

SUMMARY

In view of the above, the disclosure provides a data writing method, a memory storage device, and a memory control circuit unit capable of allocating the number of physical blocks required to store virtual blocks of a system table according to the capacity of the system table in response to actual needs, so that the utilization of the physical blocks can be effectively improved.

An exemplary embodiment of the disclosure provides a data writing method for a memory storage device. The memory storage device includes a rewritable non-volatile memory module. The rewritable non-volatile memory module stores a plurality of physical blocks. The data writing method includes the following steps. A first number is calculated according to a ratio of a capacity of at least one first system table to a capacity of a physical block. A second number is calculated according to a ratio of a capacity of at least one second system table to the capacity of the physical block. At least one physical block is obtained from the plurality of physical blocks as a first virtual block and a second virtual block based on the first number and the second number respectively.

In an exemplary embodiment of the disclosure, the capacity of each of the at least one first system table is less than the capacity of the physical block, and the capacity of each of the at least one second system table is equal to or greater than the capacity of the physical block.

In an exemplary embodiment of the disclosure, a firmware internal system information link table used to store management information of the memory storage device includes the at least one first system table and the at least one second system table.

In an exemplary embodiment of the disclosure, the first virtual block is used to store the at least one first system table, and the second virtual block is used to store the at least one second system table.

In an exemplary embodiment of the disclosure, the step of obtaining the at least one physical block from the plurality of physical blocks as the first virtual block and the second virtual block based on the first number and the second number respectively further includes the following. The at least one physical block is selected by performing partition management on each chip enable (CE) region and each data plane of the rewritable non-volatile memory module.

In an exemplary embodiment of the disclosure, the data writing method further includes the following. Remaining physical blocks other than the at least one physical block is allocated as a data block.

In an exemplary embodiment of the disclosure, the data block is used to store user data from a host system.

An exemplary embodiment of the disclosure further provides a memory storage device including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The rewritable non-volatile memory module stores a plurality of physical blocks. The memory control circuit unit is configured to calculate a first number according to a ratio of a capacity of at least one first system table to a capacity of a physical block. The memory control circuit unit is further configured to calculate a second number according to a ratio of a capacity of at least one second system table to the capacity of the physical block. The memory control circuit unit is further configured to obtain at least one physical block from the plurality of physical blocks as a first virtual block and a second virtual block based on the first number and the second number respectively.

In an exemplary embodiment of the disclosure, the memory control circuit unit is further configured to select the at least one physical block by performing partition management on each chip enable region and each data plane of the rewritable non-volatile memory module.

In an exemplary embodiment of the disclosure, the memory control circuit unit is further configured to allocate remaining physical blocks other than the at least one physical block as a data block.

An exemplary embodiment of the disclosure further provides a memory control circuit unit disposed in a memory storage device and configured to control a rewritable non-volatile memory module. The rewritable non-volatile memory module stores a plurality of physical blocks. The memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management circuit is configured to calculate a first number according to a ratio of a capacity of at least one first system table to a capacity of a physical block. The memory management circuit is further configured to calculate a second number according to a ratio of a capacity of at least one second system table to the capacity of the physical block. The memory management circuit is further configured to obtain at least one physical block from the plurality of physical blocks as a first virtual block and a second virtual block based on the first number and the second number respectively.

In an exemplary embodiment of the disclosure, the memory management circuit is further configured to select the at least one physical block by performing partition management on each chip enable region and each data plane of the rewritable non-volatile memory module.

In an exemplary embodiment of the disclosure, the memory management circuit is further configured to allocate remaining physical blocks other than the at least one physical block as a data block.

To sum up, in the data writing method, the memory storage device, and the memory control circuit unit provided by the disclosure, the first virtual block and the second virtual block may be allocated according to the actual needs (i.e., the number of physical blocks required to store the at least one first system table and the at least one second system table) of the at least one first system table and the at least one second system table. In this way, the problem of a large amount of waste of physical blocks can be avoided, and the utilization of physical blocks can be effectively improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Generally, a memory storage device (aka a memory storage system) includes a rewritable non-volatile memory module and a controller (aka a control circuit). The memory storage device may be used together with a host system, so that the host system may write data into the memory storage device or may read data from the memory storage device.

Figure 1:
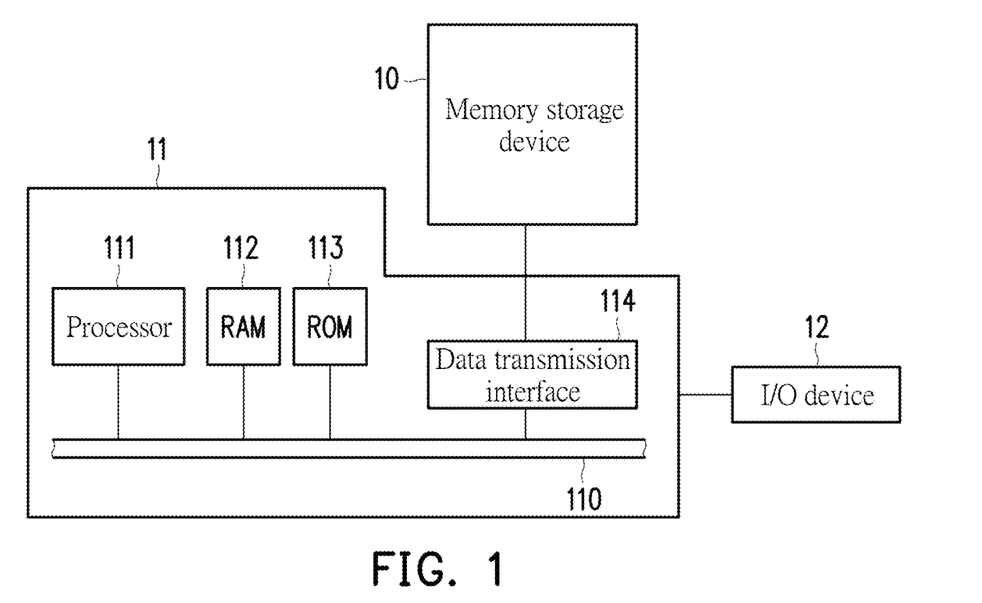
FIG. 1 is a schematic view illustrating a host system, a memory storage device, and an input/output (I/O) device according to an exemplary embodiment of the disclosure.
Figure 2:
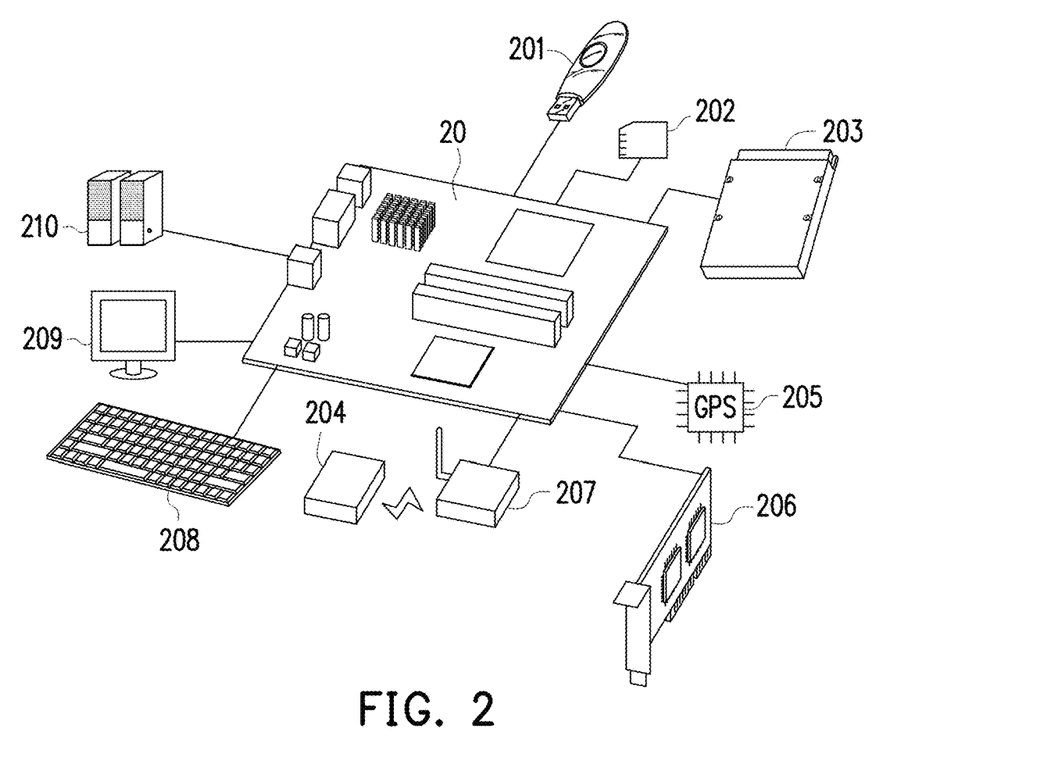
FIG. 2 is a schematic view illustrating the host system, the memory storage device, and the I/O device according to an exemplary embodiment of the disclosure.

FIG. 1 is a schematic view illustrating a host system, a memory storage device, and an input/output (I/O) device according to an exemplary embodiment of the disclosure. FIG. 2 is a schematic view illustrating the host system, the memory storage device, and the I/O device according to an exemplary embodiment of the disclosure.

With reference to FIG. 1 and FIG. 2, a host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to a memory storage device 10 through the data transmission interface 114. For instance, the host system 11 may store data into the memory storage device 10 or may read data from the memory storage device 10 through the data transmission interface 114. Further, the host system 111 may be coupled to an I/O device 12 through the system bus 110. For instance, the host system 11 may transmit an output signal to the I/O device 12 or receive an input signal from the I/O device 12 through the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or plural. Through the data transmission interface 114, the motherboard 20 may be coupled to the memory storage device 10 through wired or wireless methods.

In an exemplary embodiment, the memory storage device 10 may be, for example, a flash drive 201, a memory card 202, a solid state drive (SSD) 203, or a wireless memory storage device 204. The wireless memory storage device 204 may be, for example, a memory storage device based on various wireless communication technologies, such as a near field communication (NFC) memory storage device, a wireless fidelity (WiFi) memory storage device, a Bluetooth memory storage device, or a low energy Bluetooth memory storage device (e.g., iBeacon). Besides, the motherboard 20 may also be coupled to various I/O devices including a global positioning system (GPS) module 205, a network interface card 206, a wireless transmission device 207, a keyboard 208, a monitor 209, and a speaker 210 through the system bus 110. For instance, in an exemplary embodiment, the motherboard 20 may access the wireless memory storage device 204 through the wireless transmission device 207.

In an exemplary embodiment, the host system 11 may be a computer system. In an exemplary embodiment, the host system 11 may be any system capable of substantially cooperating with the memory storage device for storing data. In an exemplary embodiment, the memory storage device 10 and the host system 11 may include a memory storage device 30 and a host system 31 of FIG. 3 respectively.

Figure 3:
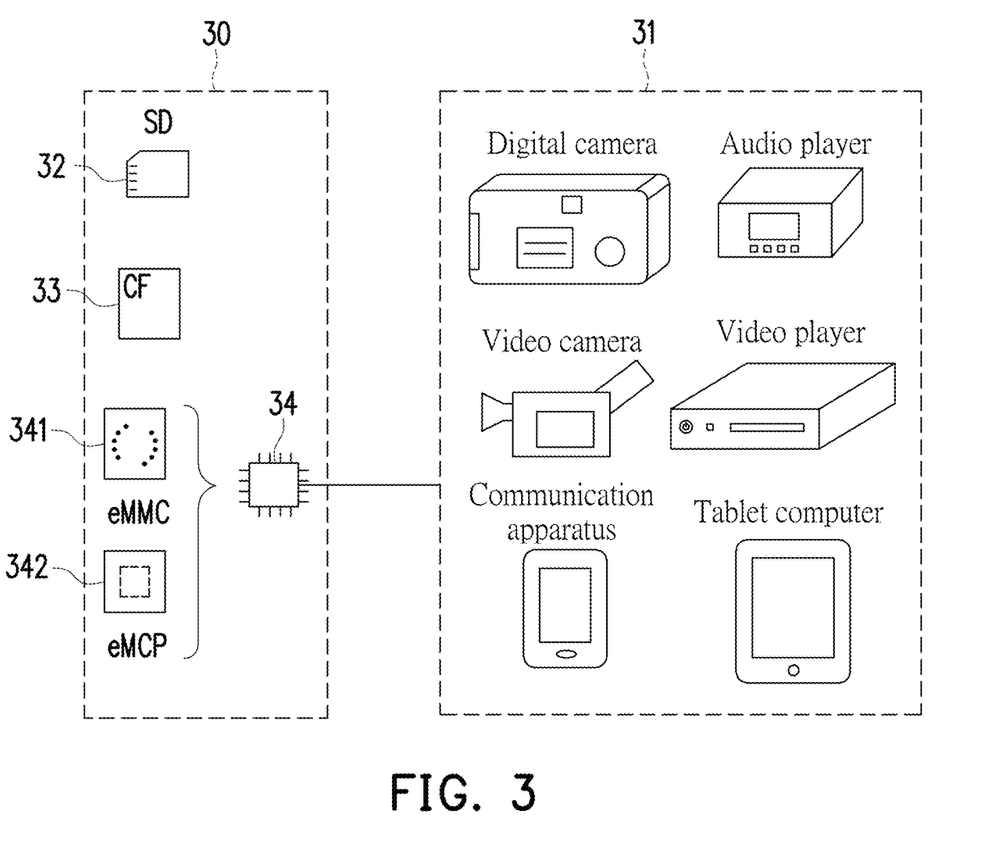
FIG. 3 is a schematic view illustrating a host system and a memory storage device according to an exemplary embodiment of the disclosure.

FIG. 3 is a schematic view illustrating a host system and a memory storage device according to an exemplary embodiment of the disclosure.

With reference to FIG. 3, the memory storage device 30 may be used together with the host system 31 to store data. For instance, the host system 31 may be a system such as a digital camera, a video camera, a communication apparatus, an audio player, a video player, or a tablet computer. For instance, the memory storage device 30 may be a non-volatile memory storage device used by the host system 31, such as a secure digital (SD) card 32, a compact flash (CF) card 33, or an embedded storage device 34. The embedded storage device 34 includes various embedded storage devices capable of directly coupling a memory module onto a substrate of the host system, such as an embedded Multi Media Card (eMMC) 341 and/or an embedded Multi Chip Package (eMCP) storage device 342.

Figure 4:
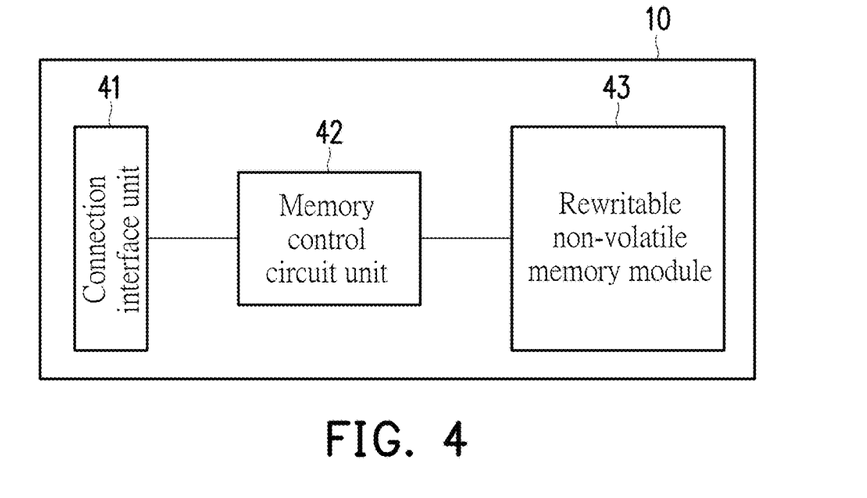
FIG. 4 is a schematic view illustrating the memory storage device according to an exemplary embodiment of the disclosure.

FIG. 4 is a schematic view illustrating the memory storage device according to an exemplary embodiment of the disclosure.

With reference to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 through the connection interface unit 41. In an exemplary embodiment, the connection interface unit 41 is compatible with the peripheral component interconnect express (PCI Express) standard. In an exemplary embodiment, the connection interface unit 41 may also comply with the Serial Advanced Technology Attachment (SATA) standard, the Parallel Advanced Technology Attachment (PATA) standard, the Institute of Electrical and Electronic Engineers (IEEE) 1394 standard, the Universal Serial Bus (USB) standard, the Secure Digital (SD) interface standard, the Ultra High Speed-I (UHS-I) interface standard, the Ultra High Speed-II (UHS-II) interface standard, the Memory Stick (MS) interface standard, the Multi Chip Package (MCP) interface standard, the Multi Media Card (MMC) interface standard, the embedded Multi Media Card (eMMC) interface standard, the Universal Flash Storage (UFS) interface standard, the embedded Multi Chip Package (eMCP) interface standard, the Compact Flash (CF) interface standard, the Integrated Device Electronics (IDE) interface standard, or other applicable standards. The connection interface unit 41 may be packaged in a chip together with the memory control circuit unit 42, or the connection interface unit 41 is disposed outside a chip including the memory control circuit unit 42.

The memory control circuit unit 42 is coupled to the connection interface unit 41 and the rewritable non-volatile memory module 43. The memory control circuit unit 42 is configured to execute a plurality of logic gates or control commands which are implemented in a form of hardware or firmware and to execute operations of data writing, reading, or erasing in the rewritable non-volatile memory module 43 according to the commands of the host system 11.

The rewritable non-volatile memory module 43 is configured to store data written by the host system 11. The rewritable non-volatile memory module 43 may include a single level cell (SLC) NAND flash memory module (i.e., a flash memory module capable of storing 1 bit in one memory cell), a multi level cell (MLC) NAND flash memory module (i.e., a flash memory module capable of storing 2 bits in one memory cell), a triple level cell (TLC) NAND flash memory module (i.e., a flash memory module capable of storing 3 bits in one memory cell), a quad level cell (QLC) NAND flash memory module (i.e., a flash memory module capable of storing 4 bits in one memory cell), other flash memory modules, or any memory module having the same features.

Each memory cell in the rewritable non-volatile memory module 43 stores one bit or more bits with a change in voltage (referred to as "threshold voltage" hereinafter). Specifically, a charge trapping layer is provided between a control gate of each memory cell and a channel. By applying a write voltage to the control gate, the amount of electrons of the charge trapping layer may be changed, and the threshold voltage of the memory cell is thereby changed. The operation of changing the threshold voltage of the memory cell is also called as "writing data to the memory cell" or "programming the memory cell". Each memory cell in the rewritable non-volatile memory module 43 has a plurality of storage states according to the change of the threshold voltage. The storage state of the memory cell may be determined by applying a reading voltage, and the one or more bits stored in the memory cell is thereby obtained.

In an exemplary embodiment, the memory cells of the rewritable non-volatile memory module 43 may form a plurality of physical programming units, and these physical programming units may form a plurality of physical blocks. Specifically, the memory cells on the same word line may form one physical programming unit or a plurality of physical programming units. If each of the memory cells stores 2 bits or more bits, the physical programming units on the same word line may at least be categorized as a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in an MLC NAND flash memory module, the writing speed of the lower physical programming unit may be greater than the writing speed of the upper physical programming unit, and/or the reliability of the lower physical programming unit is greater than the reliability of the upper physical programming unit.

In an exemplary embodiment, the physical programming units are the smallest units for programming. That is, the physical programming units are the minimum units for writing data. For example, the physical programming units may be physical pages or physical sectors. When the physical programming units are the physical pages, these physical programming units may include a data bit region and a redundancy bit region. The data bit region includes a plurality of physical sectors configured for storing user data, and the redundancy bit region is configured for storing system data (e.g., management data such as an error correcting code). In an exemplary embodiment, the data bit region includes 32 physical sectors, and the size of each of the physical sectors is 512 bytes (B). However, in other exemplary embodiments, the data bit region may include 8, 16, or more or fewer physical sectors. The size of each of the physical sectors may be greater or smaller. On the other hand, the physical blocks are the minimum units for erasing. That is, each of the physical blocks contains the least number of memory cells to be erased together. For instance, the physical blocks are physical blocks.

Figure 5:
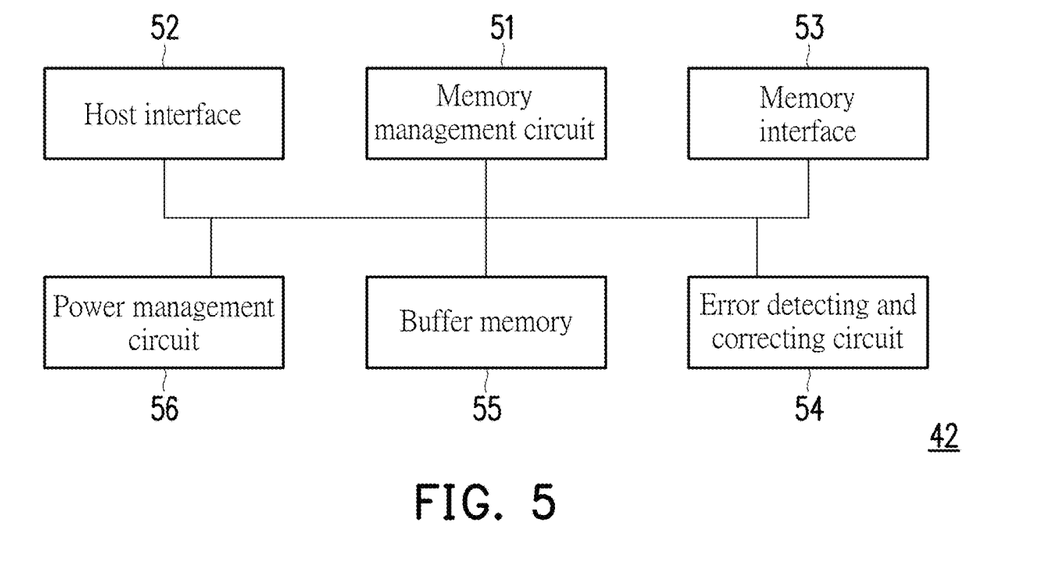
FIG. 5 is a schematic view illustrating a memory control circuit unit according to an exemplary embodiment of the disclosure.

FIG. 5 is a schematic view illustrating a memory control circuit unit according to an exemplary embodiment of the disclosure.

With reference to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has a plurality of control commands. When the memory storage device 10 runs, these control commands are executed to perform various operations such as data writing, data reading, and data erasing. The following description of the operation of the memory management circuit 51 is equivalent to the description of the operation of the memory control circuit unit 42.

In an exemplary embodiment, the control commands of the memory management circuit 51 are implemented in a form of firmware. For instance, the memory management circuit 51 has a microprocessor unit (not shown) and a read-only memory (not shown), and these control commands are burnt into the read-only memory. When the memory storage device 10 works, these control commands are executed by the microprocessor unit for performing various operations, such as data writing, data reading, and data erasing.

In an exemplary embodiment, the control commands of the memory management circuit 51 may also be stored in a specific region (for example, a system region in the memory module exclusively used for storing system data) of the rewritable non-volatile memory module 43 in the form of program codes. Moreover, the memory management circuit 51 has a microprocessor unit (not shown), a read-only memory (not shown), and a random access memory (not shown). In particular, this read-only memory has a boot code, and when the memory control circuit unit 42 is enabled, the boot code is executed by the microprocessor unit first for loading the control commands stored in the rewritable non-volatile memory module 43 to the random access memory of the memory management circuit 51. Afterwards, the microprocessor unit executes these control commands for various operations such as data writing, data reading, and data erasing.

In an exemplary embodiment, the control commands of the memory management circuit 51 may be implemented in a hardware form. For example, the memory management circuit 51 includes a microprocessor, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microprocessor. The memory cell management circuit is configured to manage the memory cells or the memory cell groups of the rewritable non-volatile memory module 43. The memory writing circuit is configured to issue a write command sequence to the rewritable non-volatile memory module 43, so as to write data into the rewritable non-volatile memory module 43. The memory reading circuit is configured to issue a read command sequence to the rewritable non-volatile memory module 43, so as to read data from the rewritable non-volatile memory module 43. The memory erasing circuit is configured to issue an erase command sequence to the rewritable non-volatile memory module 43, so as to erase data from the rewritable non-volatile memory module 43. The data processing circuit is configured to process data to be written into the rewritable non-volatile memory module 43 and data to be read from the rewritable non-volatile memory module 43. Each of the write command sequence, the read command sequence, and the erase command sequence may include one or more program codes or command codes and is configured to instruct the rewritable non-volatile memory module 43 to execute corresponding data operations such as data writing, data reading, and data erasing. In an exemplary embodiment, the memory management circuit 51 may further issue other types of command sequences to the rewritable non-volatile memory module 43 to instruct the execution of corresponding operations.

The host interface 52 is coupled to the memory management circuit 51. The memory management circuit 51 may communicate with the host system 11 through the host interface 52. The host interface 52 may be configured to receive and identify commands and data sent from the host system 11. For instance, the commands and the data sent from the host system 11 may be transmitted to the memory management circuit 51 through the host interface 52. Besides, the memory management circuit 51 may transmit data to the host system 11 through the host interface 52. In this exemplary embodiment, the host interface 52 is compatible with the PCI Express standard. However, it should be understood that the disclosure is not limited thereto, and the host interface 52 may also be compatible to the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other applicable standards for data transmission.

The memory interface 53 is coupled to the memory management circuit 51 and is configured to access the rewritable non-volatile memory module 43. For instance, the memory management circuit 51 may access the rewritable non-volatile memory module 43 through the memory interface 53. In other words, data to be written to the rewritable non-volatile memory module 43 is converted into the format acceptable to the rewritable non-volatile memory module 43 through the memory interface 53. Specifically, when the memory management circuit 51 is to access the rewritable non-volatile memory module 43, the memory interface 53 sends the corresponding command sequences. For instance, these command sequences may include a write command sequence instructing data-writing, a read command sequence instructing data-reading, an erase command sequence instructing data-erasing, and corresponding command sequences configured for instructing various memory operations (e.g., changing reading voltage levels or executing garbage collection, etc.). The command sequences are generated by, for example, the memory management circuit 51, and are sent to the rewritable non-volatile memory module 43 through the memory interface 53. These command sequences may include one or more signals or data on the bus. These signals or data may include command codes or program codes. For example, the read command sequence may include information such as identification codes and memory addresses.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is configured to execute an error detecting and correcting operation to ensure the correctness of data. To be specific, when the memory management circuit 51 receives a write command from the host system 11, the error detecting and correcting circuit 54 generates a corresponding error correcting (ECC) code and/or an error detecting code (EDC) for the data corresponding to the write command, and the memory management circuit 51 writes the data corresponding to the write command and the corresponding error correcting code and/or the error detecting code to the rewritable non-volatile memory module 43. Afterwards, when the memory management circuit 51 reads the data from the rewritable non-volatile memory module 43, the corresponding error correcting code and/or the error detecting code is simultaneously read, and the error detecting and correcting circuit 54 executes error detecting and correcting operations for the read data based on the error correcting code and/or the error detecting code.

The buffer memory 55 is coupled to the memory management circuit 51 and is used to temporarily store data. The power management unit 56 is coupled to the memory management circuit 51 and is configured to control power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
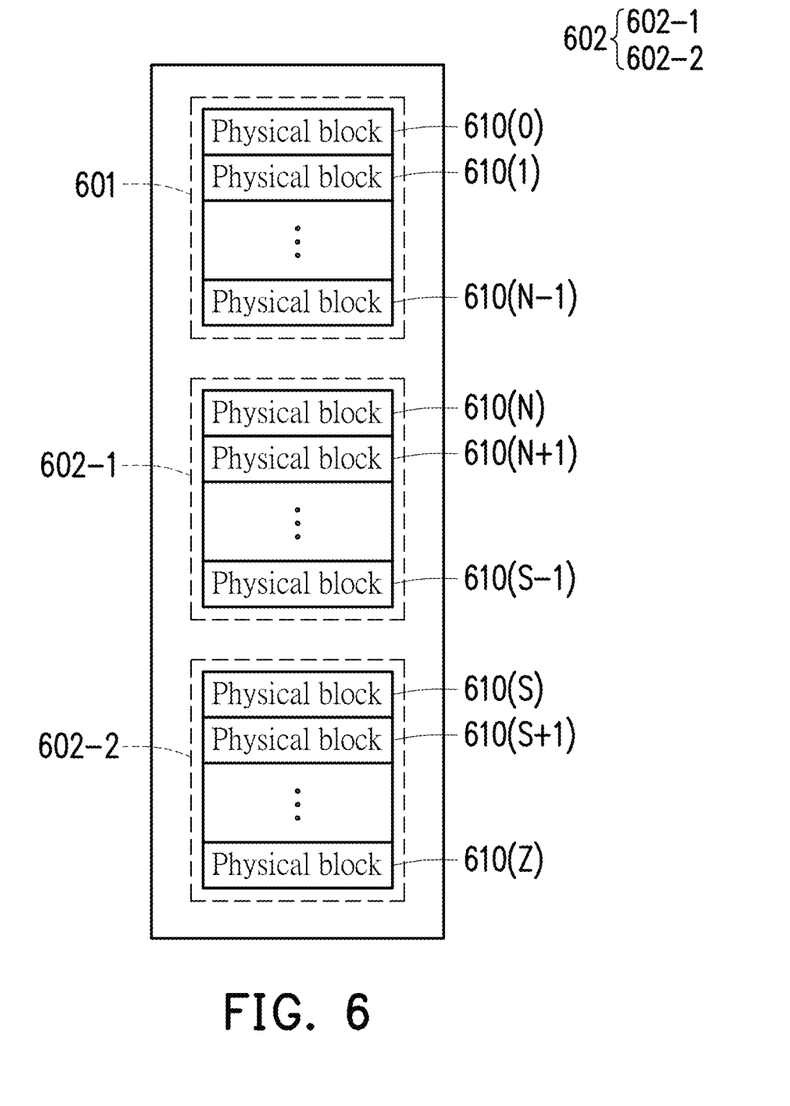
FIG. 6 is a schematic view illustrating management of a rewritable non-volatile memory module according to an exemplary embodiment of the disclosure.

FIG. 6 is a schematic view illustrating management of a rewritable non-volatile memory module according to an exemplary embodiment of the disclosure.

With reference to FIG. 6, the memory management circuit 51 may logically group physical blocks 610(0) to 610(Z) in the rewritable non-volatile memory module 43 into a system block 601 and a data block 602.

Further, the memory management circuit 51 manages the physical blocks that logically belong to the system block 601 by constructing at least one or more virtual blocks. In other words, each virtual block includes at least one or more physical blocks.

More specifically, these virtual blocks are used to store a plurality of system tables of the memory storage device 10. The system tables are a data structure, and through the system tables, a flash memory translation layer (FTL for short) of the memory storage device 10 may convert logical addresses into physical addresses, so that data may be stored and accessed correctly. In an embodiment, the system tables may also be used to store management information of the memory storage device 10. The management information includes but not limited to data tables such as a bad block table, a logical-to-physical mapping table (L2P table), a free block list, or other variables of the rewritable non-volatile memory module 43.

A storage region 602-1 and an idle region 602-2 logically belonging to the data block 602 are used to store data from the host system 11. Specifically, the physical blocks of the storage region 602-1 are treated as the physical blocks of stored data, and the physical blocks of the idle region 602-2 are used to replace the physical blocks of the storage region 602-1. In other words, when a write command and data to be written are received from the host system 11, the memory management circuit 51 (or the memory control circuit unit 42) may extract the physical blocks from the idle region 602-2 and write data, so as to replace the physical blocks in the storage region 602-1.

In particular, the number of physical blocks in the system block 601, the storage region 602-1, and the idle region 602-2 may vary according to different memory specifications. Besides, it must be understood that during the operation of the memory storage device 10, the grouping relationship between the physical blocks in association with the system block 601, the storage region 602-1, and the idle region 602-2 may dynamically change.

Figure 7:
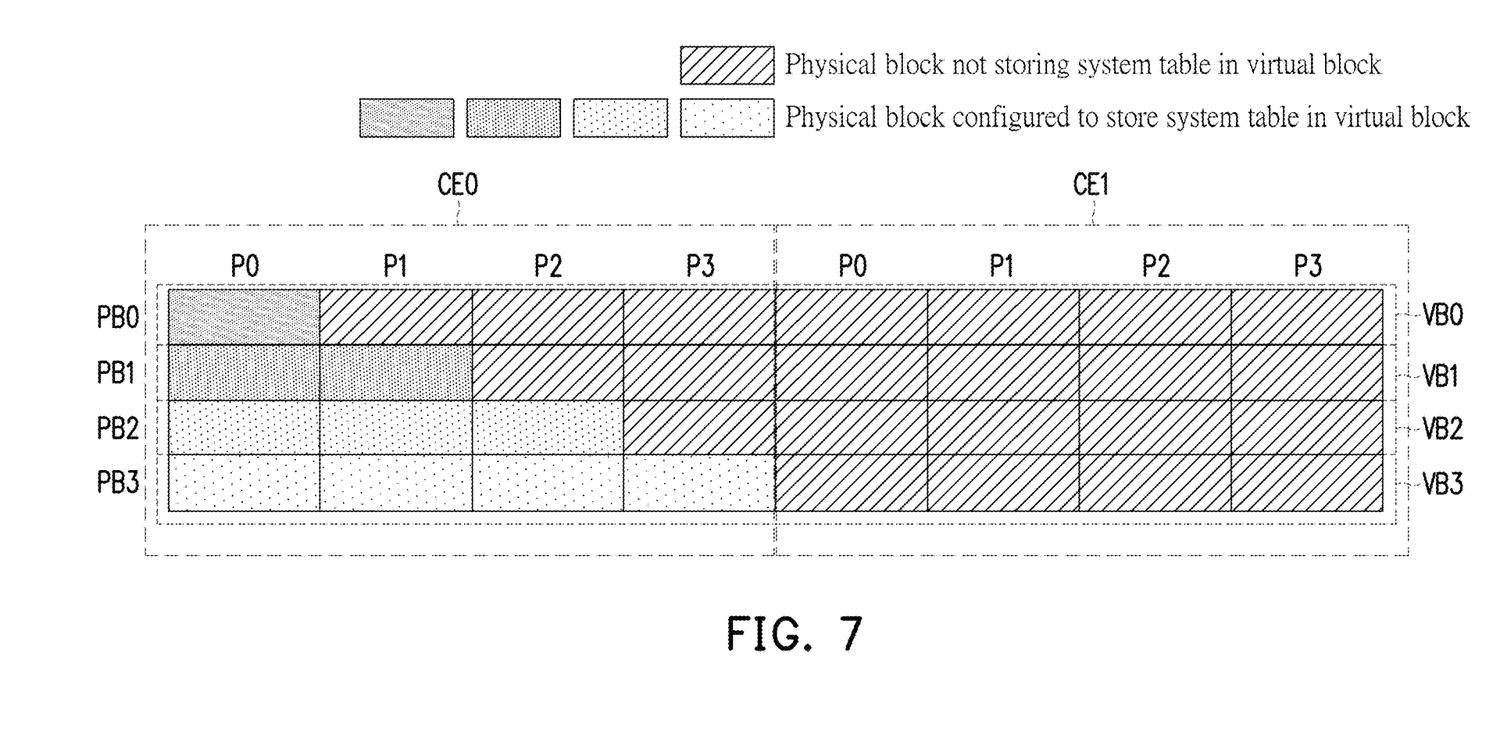
FIG. 7 is a schematic view illustrating management of virtual blocks according to an exemplary embodiment of the disclosure.

FIG. 7 is a schematic view illustrating management of virtual blocks according to an exemplary embodiment of the disclosure. With reference to FIG. 7, it is assumed that the rewritable non-volatile memory module 43 has 2 chip enable regions CE0 and CE1 and 4 data planes P0 to P3. In FIG. 7, each of the virtual blocks VB0 to VB3 fixedly contains 8 physical blocks, and each of the virtual blocks VB0 to VB3 is used to store 1 system table. As shown in FIG. 7, there are currently 4 different system tables that need to be stored in the virtual blocks VB0 to VB3.

Taking the virtual block VB0 as an example, the virtual block VB0 includes the physical block PB0 of the data planes P0 to P3 of the chip enable region CE0 and the physical block PB0 of the data planes P0 to P3 of the chip enable region CE1. Only 1 physical block (i.e., the physical block PB0 of the data plane P0 of the chip enable region CE0) in VB0 is used to store the system tables, and the other 7 physical blocks in VB0 are not used to store the system tables.

Taking the virtual block VB1 as an example, the virtual block VB1 includes the physical block PB1 of the data planes P0 to P3 of the chip enable region CE0 and the physical block PB1 of the data planes P0 to P3 of the chip enable region CE1. Only 2 physical blocks (i.e., the physical blocks PB1 of the data planes P0 and P1 of the chip enable region CE0) in VB1 are used to store the system tables, and the other 6 physical blocks in VB1 are not used to store the system tables.

Taking the virtual block VB2 as an example, the virtual block VB2 includes the physical block PB2 of the data planes P0 to P3 of the chip enable region CE0 and the physical block PB2 of the data planes P0 to P3 of the chip enable region CE1. Only 3 physical blocks (i.e., the physical blocks PB2 of the data planes P0 to P2 of the chip enable region CE0) in VB2 are used to store the system tables, and the other 5 physical blocks in VB2 are not used to store the system tables.

Taking the virtual block VB3 as an example, the virtual block VB3 includes the physical block PB3 of the data planes P0 to P3 of the chip enable region CE0 and the physical block PB3 of the data planes P0 to P3 of the chip enable region CE1. Only 4 physical blocks (i.e., the physical blocks PB3 of the data planes P0 to P3 of the chip enable region CE0) in VB3 are used to store the system tables, and the other 4 physical blocks in VB3 are not used to store the system tables.

According to the above, there are multiple physical blocks in the virtual blocks VB0 to VB3 that are not used to store the system tables. In FIG. 7, the capacities of the system tables are not considered, and using fixed-capacity (i.e., each of the virtual blocks VB0 to VB3 contains a fixed number of physical blocks) virtual blocks to store the system tables may significantly reduce the utilization of the physical blocks. In other words, there may be a large number of unused physical blocks in the system block 601 in FIG. 6.

In order to solve the problem of low utilization of physical blocks in the above exemplary embodiments, the disclosure provides a data writing method capable of determining the number of physical blocks included in the virtual blocks used to store the system tables according to the capacities of the system tables, and the utilization of the physical blocks may thus be improved. That is, under the data writing method provided by the disclosure, there are no unused physical blocks in the system block 601 in FIG. 6, and the number of physical blocks belonging to the data block 602 may also increase.

In an exemplary embodiment, the physical blocks of the system block 601 may be written into a firmware internal system information link table. Specifically, the firmware internal system information link table is a plurality of system tables used to store management information of the memory storage device 10. The firmware internal system information link table is a data structure used to store the distribution and usage of the plurality of physical blocks of the rewritable non-volatile memory module 43, such as the locations, status, and related information of the plurality of physical blocks.

For instance, the firmware internal system information link table includes but not limited to the following management information: a logical-to-physical mapping table (L2P table) that records the mapping relationship between the logical addresses and the physical addresses, a bad block table that records all damaged physical blocks in the rewritable non-volatile memory module 43, garbage collection information that records the location and status of the physical blocks in the rewritable non-volatile memory module 43 that need to be garbage collected, a free block list that records the locations of currently available free physical blocks in the rewritable non-volatile memory module 43, write amplification information that records the write amplification factor of each physical block, error checking and correcting (ECC) information that records the address and status of the ECC code of each physical block, the number of erasures of each physical block, the erasure status of each physical block, and the number of reads of each physical block and other related information. It is worth mentioning that the specific content of the firmware internal system information link table may vary depending on the brand and model of the memory storage device 10.

In an exemplary embodiment provided by the disclosure, according to the firmware internal system information link table written in the system block 601, the number of physical blocks included in the virtual block used to store this firmware internal system information link table may be determined, and the utilization of the physical blocks may thus be improved.

In an exemplary embodiment, when the memory management circuit 51 intends to write a small-capacity firmware internal system information link table (e.g., ECC information) into the system block 601, the memory management circuit 51 may write the ECC information to a physical page in the system block 601. That is, when the memory management circuit 51 intends to write data with a small capacity (for example, smaller than the capacity of a physical page) into the system block 601, the memory management circuit 51 may use a physical page to store the data. That is, when the memory management circuit 51 intends to write data with a small capacity (for example, smaller than the capacity of a physical block) into the system block 601, the memory management circuit 51 may use a plurality of physical pages in a physical block to store this data.

In an exemplary embodiment, when the memory management circuit 51 intends to write a large-capacity firmware internal system information link table (e.g., L2P table) into the system block 601, the memory management circuit 51 may write the L2P table into multiple physical blocks in the system block 601. That is, when the memory management circuit 51 intends to write data with a large capacity (for example, larger than the capacity of a physical block) into the system block 601, the memory management circuit 51 may use multiple physical blocks in the system block 601 to store this data.

In an exemplary embodiment, assuming that there is a firmware internal system information link table (e.g., a mapping table) with a capacity larger than that of a physical block, the memory management circuit 51 may use 1 bit to store this firmware internal system information link table. In this exemplary embodiment, the memory management circuit 51 may obtain the number of physical blocks required for the virtual block according to the number of bits used to record the firmware internal system information link table.

In an exemplary embodiment, when the memory management circuit 51 intends to write first data with a capacity of 8 MB into the rewritable non-volatile memory module 43, the memory management circuit 51 may write the firmware internal system information link table (i.e., the firmware internal system information link table used to record the location and/or status information occupied by the first data) associated with the first data into the system block 601. In addition, when the memory management circuit 51 intends to write second data with a capacity of 10 GB into the rewritable non-volatile memory module 43, the memory management circuit 51 may write the firmware internal system information link table (i.e., the firmware internal system information link table used to record the location and/or status information occupied by the second data) associated with the second data into the system block 601. It is worth mentioning that since the capacity of the second data is greater than the capacity of the first data, the information and capacity recorded in the firmware internal system information link table associated with the second data may be greater than the information and capacity recorded in the firmware internal system information link table associated with the first data. Therefore, the memory management circuit 51 needs to use more physical blocks to store the firmware internal system information link table associated with the second data.

In an exemplary embodiment, the memory management circuit 51 may determine the number of physical blocks required for the virtual block according to the system table. Specifically, since the capacity of a physical block and the capacity of a physical page are recorded in the firmware internal system information link table, the memory management circuit 51 may determine the number of physical blocks required for the virtual block according to the capacity of the data to be written and the capacity of a physical block or the capacity of a physical page. For instance, the memory management circuit 51 may divide the capacity of the data to be written by the capacity of a physical block to obtain the required number of physical blocks. Alternatively, the memory management circuit 51 may divide the capacity of the data to be written by the capacity of a physical page to obtain the required number of physical pages and further obtain the required number of physical blocks. In other words, the memory management circuit 51 may determine the number of physical blocks required for the virtual block according to the ratio of the capacity of the data to be written to a physical block or a physical page.

Figure 8:
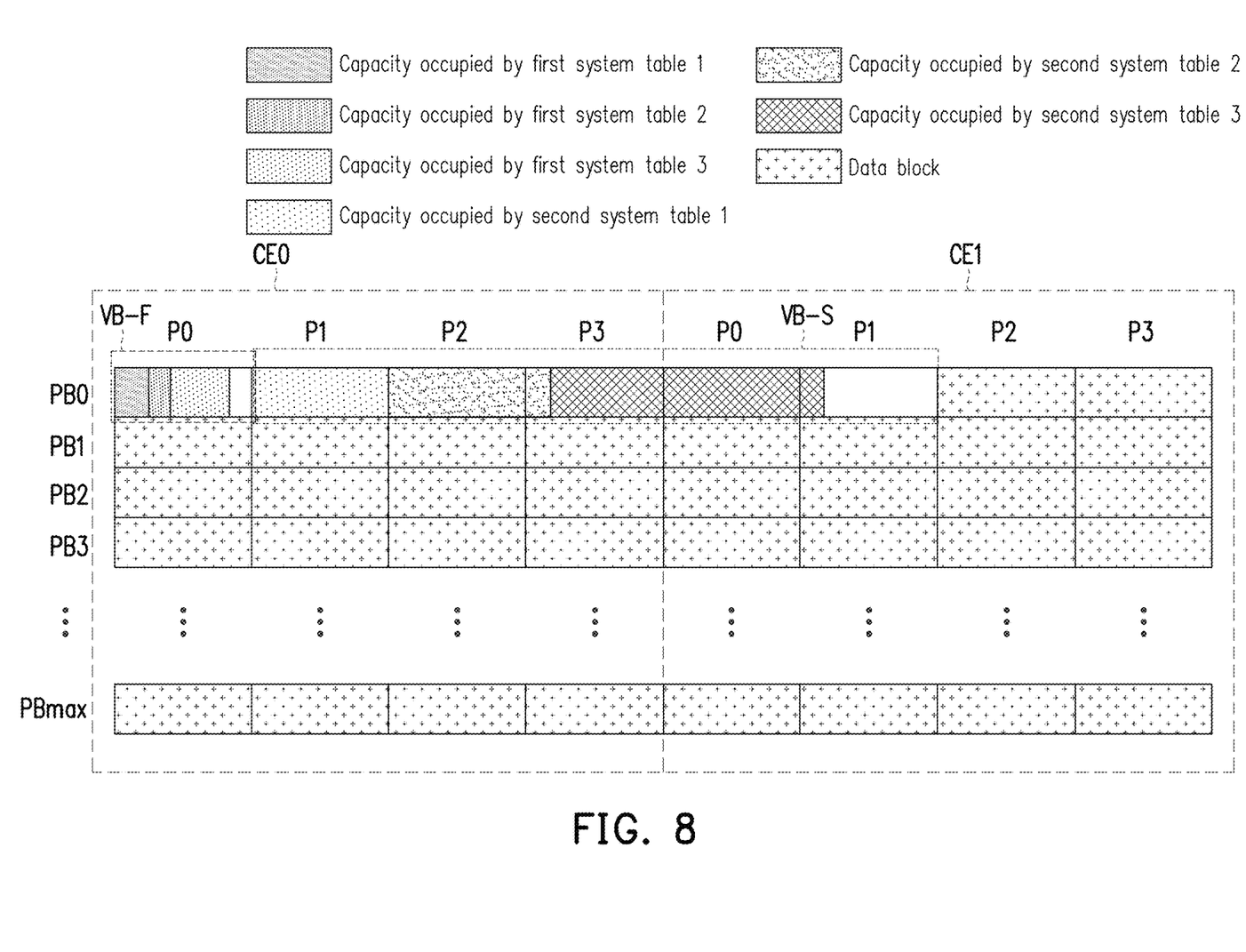
FIG. 8 is a schematic view illustrating management of the rewritable non-volatile memory module according to an exemplary embodiment of the disclosure.

FIG. 8 is a schematic view illustrating management of the rewritable non-volatile memory module according to an exemplary embodiment of the disclosure.

With reference to FIG. 8, it is assumed that the rewritable non-volatile memory module 43 has 2 chip enable regions CE0 and CE1 and 4 data planes P0 to P3.

In this exemplary embodiment, the memory management circuit 51 may determine the number of physical blocks required for the virtual block according to the firmware internal system information link table.

In this exemplary embodiment, the firmware internal system information link table includes at least one first system table and the at least one second system table. To be specific, a capacity of each first system table is less than a capacity of one physical block, and a capacity of each second system table is equal to or larger than the capacity of one physical block. That is, the capacity of one second system table is greater than the capacity of one first system table.

The memory management circuit 51 may provide two virtual blocks (e.g., a first virtual block and a second virtual block) of different capacities according to actual needs to respectively store the first system table and the second system table. That is, the first virtual block is used to store the at least one first system table, and the second virtual block is used to store the at least one second system table. In other words, the first virtual block is used to store the small-capacity (less than the capacity of one physical block) first system table, and the second virtual block is used to store the large-capacity (greater than or equal to the capacity of one physical block) second system table. That is, the memory management circuit 51 may write the first system table with a capacity smaller than the capacity of one physical block into one or more physical pages in the first virtual block. Further, the memory management circuit 51 may write the second system table with a capacity equal to or greater than the capacity of one physical block into one or more physical blocks in the second virtual block.

For instance, the first system table may be ECC information that records the address and status of the error checking and correcting code (ECC) of each physical block. The second system table may be, for example, a logical-to-physical mapping table (L2P table) that records the mapping relationship between logical addresses and physical addresses. The capacity occupied by the ECC information is less than the capacity of one physical page, so the memory management circuit 51 may write the ECC information into one physical page of the first virtual block in the system block 601. The capacity occupied by the mapping logical-to-physical mapping table is larger than the capacity of one physical block, so the memory management circuit 51 may write the logical-to-physical mapping table into multiple physical blocks of the second virtual block in the system block 601.

The memory management circuit 51 may determine the number of physical blocks as the first virtual block and the second virtual block according to actual needs of the firmware internal system information link table. To be specific, the memory management circuit 51 may use the numbers and capacities of the first system table and the second system table to determine the number of physical blocks as the first virtual block and the second virtual block.

As shown in FIG. 8, currently there are 3 first system tables and 3 second system tables, namely a first system table 1, a first system table 2, a first system table 3, a second system table 1, a second system table 2, and a second system table 3. The memory management circuit 51 may determine the capacity of the first virtual block based on the required capacities of the above 3 first system tables. Similarly, the memory management circuit 51 may determine the capacity of the second virtual block based on the required capacities of the above 3 second system tables.

To be specific, the memory management circuit 51 may calculate a first number based on a ratio of the capacities of the above 3 first system tables to the capacity of one physical block. Similarly, the memory management circuit 51 may calculate a second number based on a ratio of the capacities of the above 3 second system tables to the capacity of one physical block.

In this exemplary embodiment, the ratio of the total capacity of the first system table 1, the first system table 2, and the first system table 3 to the capacity of one physical block is 0.85. In other words, the memory management circuit 51 only needs to use 1 physical block to store all the first system tables. Therefore, the memory management circuit 51 may round up the ratio and calculate the first number to be 1. In an exemplary embodiment, the memory management circuit 51 may calculate the first number based on a ratio of the capacities of the above 3 first system tables to the capacity of one physical page. To be specific, the memory management circuit 51 may divide the total capacity of the 3 first system tables by the capacity of one physical page to obtain the number of physical pages required to store the 3 first system tables and may further obtain the above-mentioned first number according to the required number of physical pages.

On the other hand, the ratio of the total capacity of the second system table 1, the second system table 2, and the second system table 3 to the capacity of one physical block is 4.20. In other words, the memory management circuit 51 needs to use 5 physical blocks to store all the second system tables. Therefore, the memory management circuit 51 may round up the ratio and calculate the second number to be 5.

In an exemplary embodiment, the memory management circuit 51 may calculate the second number based on a ratio of the capacities of the above 3 second system tables to the capacity of one physical page. To be specific, the memory management circuit 51 may divide the total capacity of the 3 second system tables by the capacity of one physical page to obtain the number of physical pages required to store the 3 second system tables and may further obtain the above-mentioned second number according to the required number of physical pages.

Next, the memory management circuit 51 may select at least one physical block from the plurality of physical blocks in the rewritable non-volatile memory module 43 to be a first virtual block VB-F and a second virtual block VB-S based on the first number and the second number respectively. To be specific, the memory management circuit 51 may select the at least one physical block by performing partition management on each of the chip enable regions CE0 and CE1 and each of the data planes P0 to P3 of the rewritable non-volatile memory module 43.

Further, the memory management circuit 51 may first select the physical block PB0 of the data planes P0 to P3 in the chip enable region CE0 as the virtual block, and after all the physical blocks PB0 are selected, the memory management circuit 51 may then select the physical blocks PB1 of the data planes P0 to P3 in the chip enable regions CE0 and CE1 as the virtual blocks, and so on.

Taking FIG. 8 as an example, since the first number is 1 and the second number is 5, the memory management circuit 51 may first select 1 physical block (i.e., the physical block PB0) starting from the data plane P0 of the chip enable region CE0 as the first virtual block VB-F. Next, the memory management circuit 51 selects 5 physical blocks (i.e., the physical blocks PB0 of the data planes P1 to P3 in the chip enable region CE0 and the physical blocks PB0 of the data planes P0 to P1 in the chip enable region CE1) starting from the data plane P1 of the chip enable region CE0 as the second virtual blocks VB-F.

Finally, the memory management circuit 51 may be allocate remaining physical blocks other than the at least one physical block as a data block. To be specific, as shown in FIG. 8, the memory management circuit 51 may allocate all physical blocks (the physical block PB0 of the data plane P2 in the chip enable region CE1 to a physical block PBmax of the data plane P3 in the chip enable region CE1, where the physical block PBmax is the last physical block in the data planes P0 to P3) except the first virtual block VB-F and the second virtual block VB-S as data blocks for storing user data from the host system 11.

According to the above, the memory management circuit 51 may provide the first virtual block and the second virtual module respectively according to the needs of the first system table and the second system table and may use the remaining physical blocks other than the first virtual block and the second virtual block as data blocks to increase the storage space for user data. Accordingly, the problem of a large amount of waste of physical blocks in the exemplary embodiment of FIG. 7 may be avoided, which means that the utilization of the rewritable non-volatile memory module 43 may be effectively improved.

Figure 9:
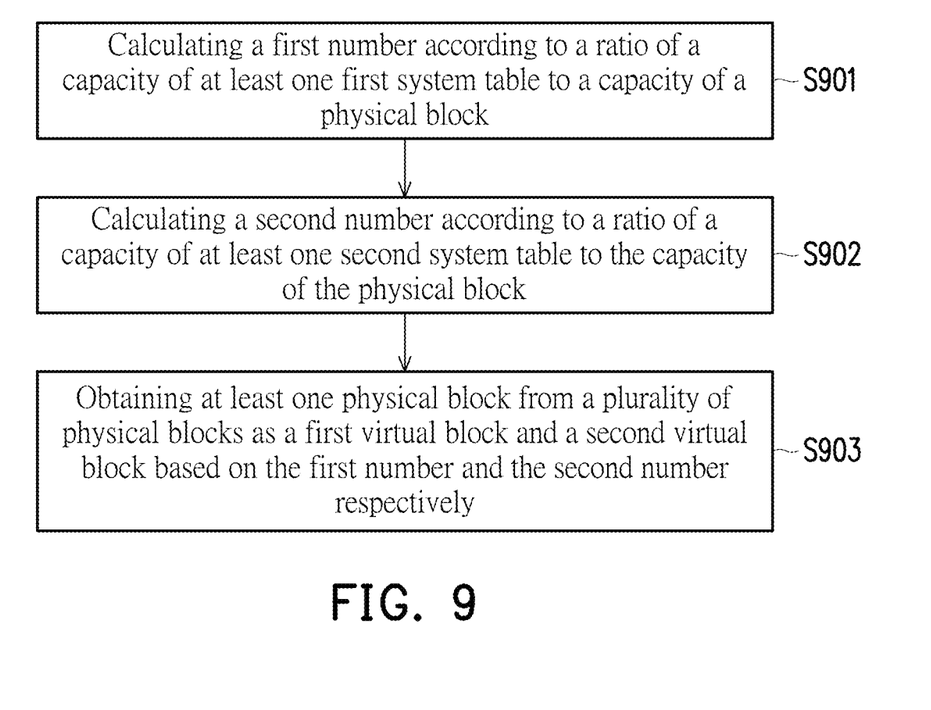
FIG. 9 is a flow chart illustrating a data writing method according to an exemplary embodiment of the disclosure.

FIG. 9 is a flow chart illustrating a data writing method according to an exemplary embodiment of the disclosure.

With reference to FIG. 9, in step S901, a first number is calculated according to a ratio of a capacity of at least one first system table to a capacity of a physical block. Next, in step S902, a second number is calculated according to a ratio of a capacity of at least one second system table to the capacity of the physical block. Finally, in step S903, at least one physical block is obtained from a plurality of physical blocks as a first virtual block and a second virtual block based on the first number and the second number respectively. The implementation details of steps S901 to S903 have been described in detail in the foregoing exemplary embodiments, so description thereof is not repeated herein. It should be noted that each step of FIG. 9 may be implemented as a plurality of program codes or circuits, which is not particularly limited by the disclosure. Besides, the method of FIG. 9 may be used in combination with the abovementioned exemplary embodiments or may be used solely, which is not particularly limited by the disclosure.

In view of the foregoing, in the data writing method, the memory storage device, and the memory control circuit unit provided by the disclosure, the first virtual block and the second virtual block may be allocated according to the actual needs (i.e., the number of physical blocks required to store the at least one first system table and the at least one second system table) of the at least one first system table and the at least one second system table. Further, the remaining physical blocks other than the first virtual block and the second virtual block may be used as the data block to provide users with data storage. Accordingly, the problem of a large amount of waste of physical blocks caused by the conventional method may be avoided, and the utilization of the rewritable non-volatile memory module may be effectively improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data writing method for a memory storage device comprising a rewritable non-volatile memory module, wherein the rewritable non-volatile memory module stores a plurality of physical blocks, and the data writing method comprises:

calculating a first number according to a ratio of a capacity of at least one first system table to a capacity of a physical block by a memory control circuit, wherein the first number is a number of physical blocks required to store the at least one first system table;

calculating a second number according to a ratio of a capacity of at least one second system table to the capacity of the physical block by the memory control circuit, wherein the second number is a number of physical blocks required to store the at least one second system table;

selecting the first number of physical blocks and the second number of physical blocks from the plurality of physical blocks as a first virtual block and a second virtual block based on the first number and the second number respectively by the memory control circuit; and allocating remaining physical blocks other than the first number of physical blocks and the second number of physical blocks as a data block by the memory control circuit, wherein the first virtual block is used to store the at least one first system table, and the second virtual block is used to store the at least one second system table, wherein the step of selecting the first number of physical blocks and the second number of physical blocks from the plurality of physical blocks as the first virtual block and the second virtual block based on the first number and the second number respectively by the memory control circuit further comprises:

firstly selecting the first number of physical blocks as the first virtual block and then selecting the second number of physical blocks as the second virtual block by performing partition management on each chip enable (CE) region and each data plane of the rewritable non-volatile memory module by the memory control circuit.

2. The data writing method according to claim 1, wherein the capacity of each of the at least one first system table is less than the capacity of the physical block, and the capacity of each of the at least one second system table is equal to or greater than the capacity of the physical block.

3. The data writing method according to claim 1, wherein a firmware internal system information link table used to store management information of the memory storage device comprises the at least one first system table and the at least one second system table.

4. The data writing method according to claim 1, wherein the data block is used to store user data from a host system.

5. A memory storage device, comprising:

a connection interface unit configured to be coupled to a host system;

a rewritable non-volatile memory module storing a plurality of physical blocks; and a memory control circuit unit coupled to the connection interface unit and the rewritable non-volatile memory module, wherein the memory control circuit unit is configured to calculate a first number according to a ratio of a capacity of at least one first system table to a capacity of a physical block, wherein the first number is a number of physical blocks required to store the at least one first system table, the memory control circuit unit is further configured to calculate a second number according to a ratio of a capacity of at least one second system table to the capacity of the physical block, wherein the second number is a number of physical blocks required to store the at least one second system table, the memory control circuit unit is further configured to select the first number of physical blocks and the second number of physical blocks from the plurality of physical blocks as a first virtual block and a second virtual block based on the first number and the second number respectively, the memory control circuit unit is further configured to firstly select the first number of physical blocks as the first virtual block and then select the second number of physical blocks as the second virtual block by performing partition management on each chip enable region and each data plane of the rewritable non-volatile memory module, and the memory control circuit unit is further configured to allocate remaining physical blocks other than the first number of physical blocks and the second number of physical blocks as a data block, wherein the first virtual block is used to store the at least one first system table, and the second virtual block is used to store the at least one second system table.

6. The memory storage device according to claim 5, wherein the capacity of each of the at least one first system table is less than the capacity of the physical block, and the capacity of each of the at least one second system table is equal to or greater than the capacity of the physical block.

7. The memory storage device according to claim 5, wherein a firmware internal system information link table used to store management information of the memory storage device comprises the at least one first system table and the at least one second system table.

8. The memory storage device according to claim 5, wherein the data block is used to store user data from the host system.

9. A memory control circuit unit disposed in a memory storage device and configured to control a rewritable non-volatile memory module, wherein the rewritable non-volatile memory module stores a plurality of physical blocks, and the memory control circuit unit comprises:

a host interface configured to be coupled to a host system;

a memory interface configured to be coupled to the rewritable non-volatile memory module; and a memory management circuit coupled to the host interface and the memory interface, wherein the memory management circuit is configured to calculate a first number according to a ratio of a capacity of at least one first system table to a capacity of a physical block, wherein the first number is a number of physical blocks required to store the at least one first system table, the memory management circuit is further configured to calculate a second number according to a ratio of a capacity of at least one second system table to the capacity of the physical block, wherein the second number is a number of physical blocks required to store the at least one second system table, the memory management circuit is further configured to select the first number of physical blocks and the second number of physical blocks from the plurality of physical blocks as a first virtual block and a second virtual block based on the first number and the second number respectively, the memory management circuit is further configured to firstly select the first number of physical blocks as the first virtual block and then select the second number of physical blocks as the second virtual block by performing partition management on each chip enable region and each data plane of the rewritable non-volatile memory module, and the memory management circuit is further configured to allocate remaining physical blocks other than the first number of physical blocks and the second number of physical blocks as a data block, wherein the first virtual block is used to store the at least one first system table, and the second virtual block is used to store the at least one second system table.

10. The memory control circuit unit according to claim 9, wherein the capacity of each of the at least one first system table is less than the capacity of the physical block, and the capacity of each of the at least one second system table is equal to or greater than the capacity of the physical block.

11. The memory control circuit unit according to claim 9, wherein a firmware internal system information link table used to store management information of the memory storage device comprises the at least one first system table and the at least one second system table.

12. The memory control circuit unit according to claim 9, wherein the data block is used to store user data from a host system.

* * * * *